US012058152B2

(12) United States Patent
Williams et al.

(10) Patent No.: US 12,058,152 B2
(45) Date of Patent: *Aug. 6, 2024

(54) CLOUD-BASED IMPLEMENTATION OF DYNAMIC THREAT DETECTION

(71) Applicant: Cyber adAPT, Dallas, TX (US)

(72) Inventors: Simon Williams, San Jose, CA (US); Michael Weinberger, Dallas, TX (US); Sam Stover, Gettysburg, PA (US); David Kramer, Bethesda, MD (US)

(73) Assignee: CYBER ADAPT, INC., Dallas, TX (US)

( * ) Notice: Subject to any disclaimer, the term of this patent is extended or adjusted under 35 U.S.C. 154(b) by 192 days.

This patent is subject to a terminal disclaimer.

(21) Appl. No.: 17/564,192

(22) Filed: Dec. 28, 2021

(65) Prior Publication Data

US 2023/0171271 A1    Jun. 1, 2023

Related U.S. Application Data

(63) Continuation-in-part of application No. 17/538,652, filed on Nov. 30, 2021.

(51) Int. Cl.
*H04L 29/06* (2006.01)
*H04L 9/40* (2022.01)

(52) U.S. Cl.
CPC .......... *H04L 63/1416* (2013.01); *H04L 63/12* (2013.01); *H04L 63/1425* (2013.01)

(58) Field of Classification Search
CPC ..... H04L 63/028; H04L 63/10; H04L 63/145; H04L 63/1433; H04L 63/20; G06F 21/554

(Continued)

(56) References Cited

U.S. PATENT DOCUMENTS 9,906,557 B2 * 2/2018 Hsiung ............... H04L 41/0893
11,570,201 B2 * 1/2023 Mallis ................. H04L 63/0236
(Continued)

OTHER PUBLICATIONS

Williams, Simon, et al., "Customer Premises Equipment Implementation of Dynamic Residential Threat Detection," filed Nov. 30, 2021, U.S. Appl. No. 17/538,652.

(Continued)

*Primary Examiner* — Longbit Chai
(74) *Attorney, Agent, or Firm* — Conley Rose, P.C.; Michael W. Piper; Elexis A. Jones

(57) ABSTRACT

A dynamic cloud-based threat detection system is disclosed. The system comprises a network broker that receives communication sessions associated with communication device (s) via a network and selects and sends a predefined number of packets of each communication session to a detection based on packet selection rules. The communication device (s) comprises customer premises equipment (CPE) and/or a mobile communication device. The detection engine receives and inspects the predefined number of packets of each communication session and a governor that initiates blocking of particular communication traffic based on the inspection. The system also comprises a dynamic optimizer that monitors factor(s) and creates and sends updated packet rules to the network broker based on the monitoring. The network broker selects and sends a different predefined number of packets of each of a second plurality of communication sessions to the detection engine for inspection based on the updated packet selection rules.

20 Claims, 4 Drawing Sheets

(58) Field of Classification Search
USPC .......................................................... 726/22
See application file for complete search history.

(56) References Cited

U.S. PATENT DOCUMENTS

| | | |
|---|---|---|
| 2017/0180395 A1 | 6/2017 | Stransky-Heilkron |
| 2017/0295191 A1 | 10/2017 | Choi et al. |
| 2021/0184983 A1 | 6/2021 | Ramaswamy et al. |
| 2022/0353240 A1 | 11/2022 | McDowall et al. |

OTHER PUBLICATIONS

Williams, Simon, et al., "Hybrid Customer Premises Equipment and Cloud-Based Implementation of Dynamic Residential Threat Detection," filed Jun. 16, 2022, U.S. Appl. No. 17/842,441.

Notice of Allowance dated Mar. 14, 2024, U.S. Appl. No. 17/538,652, filed Nov. 30, 2021.

Notice of Allowance dated Apr. 4, 2024, U.S. Appl. No. 17/842,441, filed Jun. 16, 2022.

\* cited by examiner

CLOUD-BASED IMPLEMENTATION OF DYNAMIC THREAT DETECTION

CROSS-REFERENCE TO RELATED APPLICATIONS

This application is a continuation-in-part of and claims priority to U.S. patent application Ser. No. 17/538,652, filed Nov. 30, 2021, entitled "Customer Premises Equipment Implementation of Dynamic Residential Threat Detection", by Simon Williams, et al., which is hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Home network usage is changing. For example, more devices are operating on the home network and more people are working from home. In addition to the change in home network usage, there has been an overall increase in cyber security threats targeting home networks and a large number of these networks lack basic cyber security measures. As a result, home networks are more vulnerable to cyber-attacks. Additionally, given the large number of mobile communication devices, their wide daily use, and the fact that a large number of mobile communication devices lack cyber security measures in part due to the hesitancy of mobile communication device users to install security software on their mobile communication device, mobile communication devices are also vulnerable to cyber-attacks.

SUMMARY

In an embodiment, a method of dynamic cloud-based threat detection is disclosed. The method comprises receiving, by a network broker via a network, a plurality of communication sessions associated with one or more customer premises equipment (CPE) and selecting and sending, by the network broker, a predefined number of packets of each of the plurality of communication sessions to a detection engine based on packet selection rules. The method also comprises receiving, by the detection engine, the predefined number of packets of each of the plurality of communication sessions and inspecting, by the detection engine, the predefined number of packets of each of the plurality of communication sessions. The method additionally comprises notifying, by a governor, a telecommunications carrier to block particular communication traffic based on the inspection of the predefined numbers of packets of one or more of the plurality of communication sessions and monitoring, by a dynamic optimizer, one or more factors including at least one of internal threat information, external threat information, asset characteristics, traffic protocol types, or CPE load characteristics. The method further comprises creating, by the dynamic optimizer, updated packet selection rules based on monitoring the one or more factors, sending, by the dynamic optimizer, the updated packet selection rules to the network broker, and selecting and sending, by the network broker, a different predefined number of packets of each of a second plurality of communication sessions associated with the one or more CPE to the detection engine for inspection based on the updated packet selection rules.

In another embodiment, a dynamic cloud-based threat detection system is disclosed. The system comprises a network broker stored in a non-transitory memory, that when executed by a processor, receives a plurality of communication sessions associated with one or more communication devices and selects and sends a predefined number of packets of each of the plurality of communication sessions to a detection engine based on packet selection rules. The one or more of the communication devices comprise at least one of customer premises equipment (CPE) or a mobile communication device. The system also comprises the detection engine stored in a non-transitory memory, that when executed by a processor, receives the predefined number of packets of each of the plurality of communication sessions and inspects the predefined number of packets of each of the plurality of communication sessions. The system additionally comprises a governor stored in a non-transitory memory, that when executed by a processor initiates blocking of particular communication traffic based on the inspection of the predefined numbers of packets of one or more of the plurality of communication sessions. The system further comprises a dynamic optimizer stored in a non-transitory memory, that when executed by a processor, monitors one or more factors including at least one of internal threat information, external threat information, asset characteristics, or traffic protocol types, creates an updated packet selection rules based on monitoring the one or more factors, and sends the updated packet selection rules to the network broker. The network broker is further configured to select and send a different predefined number of packets of each of a second plurality of communication sessions associated with the one or more communication devices to the detection engine for inspection based on the updated packet selection rules.

In yet another embodiment, a method of dynamic cloud-based threat detection is disclosed. The method comprises receiving, by a network broker via a network, a plurality of communication sessions associated with one or more mobile communication devices and selecting and sending, by the network broker, a predefined number of packets of each of the plurality of communication sessions to a detection engine based on packet selection rules. The method also comprises receiving, by the detection engine, the predefined number of packets of each of the plurality of communication sessions and inspecting, by the detection engine, the predefined number of packets of each of the plurality of communication sessions. The method additionally comprises initiating blocking, by a governor, of particular communication traffic based on the inspection of the predefined numbers of packets of one or more of the plurality of communication sessions and monitoring, by a dynamic optimizer, one or more factors including at least one of internal threat information, external threat information, asset characteristics, or traffic protocol types. The method further comprises creating, by the dynamic optimizer, updated packet selection rules based on monitoring the one or more factors, sending, by the dynamic optimizer, the updated packet selection rules to the network broker, and selecting and sending, by the network broker, a different predefined number of packets of each of a second plurality of communication sessions associated with the one or more mobile communication devices to the detection engine for inspection based on the updated packet selection rules.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
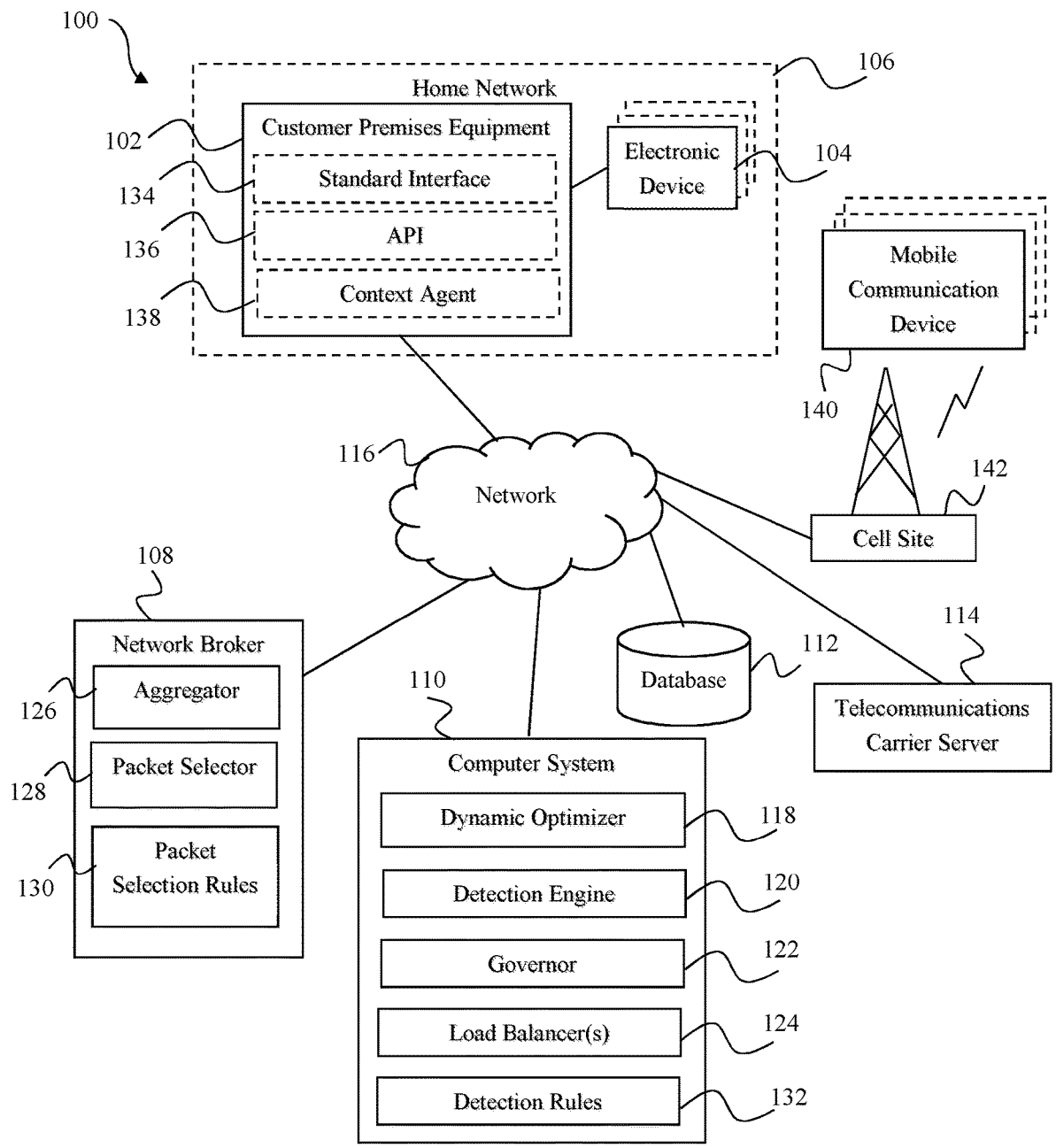
FIG. 1 is a block diagram of a dynamic cloud-based threat detection system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Because of the growing number of devices in home networks and mobile networks, and the increased, differentiated use of such networks, as well as an increase in cyber security threats and a lack of basic cyber security measures in such networks, home networks and mobile networks may be more vulnerable to cyber-attacks. Existing residential threat detection solutions focus on a reputation based detection of domains and IP addresses that are blacklisted. However, this type of reputation based detection is not all that effective as it is difficult to maintain an up-to-date blacklist since the perpetrators are constantly changing domains/IP addresses. Further, mere reputation based detection misses key exploits and malicious incoming and outgoing communications especially from new or changing players or sources.

To overcome the shortcomings in existing threat detection solutions, the pending application is directed to using packet inspection to analyze the actual payload of incoming traffic to, outgoing traffic from, or traffic within a home network and/or a mobile network. Packet inspection may include header inspection, DNS packet inspection, TLS handshake inspection, deep packet inspection, or another type of packet inspection. Use of packet inspection allows unique indicators of a cyber-attack to be identified that are difficult for the perpetrator to change. For example, packet inspection can be used to identify threats based on indicators of malware covering file types, protocol analysis, data movement/storage, URIs, PKIs, and/or other payload attributes independent of IP address/domain. However, traditional packet inspection requires extensive resources and impacts overall network performance, which is why packet inspection is typically only practiced in robust enterprise environments that have the necessary resources and can support economic implications.

The pending application navigates the bandwidth, processing, and memory challenges associated with home networks such that packet inspection can be performed for a residential environment. In particular, the pending application leverages the benefits of packet inspection while managing the challenges of the residential environment primarily through a combination of creatively architected solutions for ease of installation and/or use by the consumer (and efficiency of the telecommunications carrier) with an optimized approach to packet inspection reducing the total resources required while providing many of the key benefits improving on existing solutions. Further, the pending application navigates challenges associated with mobile networks such that packet inspection can be performed for a mobile environment.

To manage the resource challenges associated with home networks and/or mobile networks, but still provide the benefits of packet inspection, the pending application uses a dynamically optimized type of packet inspection where a predetermined number of packets for each communication session are used for packet inspection. The predetermined number of packets may be a subset of the total amount of packets in a communication session, such as the first 10 packets or some other number of packets. The predetermined number of packets may dynamically change over time based on monitoring various internal and/or external factors such as CPE load characteristics, internal threat information, external threat information, asset characteristics, or traffic protocol types. The predetermined number of packets may vary depending on the type of protocol used in the communication session (e.g., encrypted protocol type, an unencrypted protocol type, a stateful session protocol type, a stateless session protocol type, etc.). The predetermined number of packets may vary depending on an internal endpoint or an external endpoint of the communication session. The predetermined number of packets may vary depending on internal threat information, external threat information, network utilization, traffic volume, time of day, geographic location, or any other relevant factors.

The specifically architected threat detection solution discussed herein is a cloud-based implemented solution. The cloud-based implemented solution may involve no interaction with the CPE. In such an embodiment, a plurality of communication packets from a plurality of CPE may be provided by a telecommunications carrier via an aggregator in the network. A network broker may receive the communication sessions and select and send at least an initial predefined number of packets from each communication session to a detection engine operating on a cloud-based system. The network broker may apply different packet selection rules specifying different predefined numbers of packets depending on various characteristics of a given communication session (e.g., type of protocol used, an internal endpoint, an external endpoint, etc.). In order to avoid disruption of the traffic, the network broker may receive and apply the set of rules to duplicate packets instead of the original packets from the communication session.

The cloud-based system may comprise one or more load balancers to balance the load of the predefined number of packets to a plurality of virtual compute instances based on communication session for inspection by the detection engine. The detection engine of the cloud-based system inspects the predefined number of packets based on detection rules. For example, the detection engine may perform header inspection, DNS packet inspection, TLS handshake inspection, deep packet inspection, or another type of packet inspection on the predefined number of packets. Based on the inspection, if the detection engine identifies a potential cyber threat, a governor in the cloud-based system may initiate blocking of particular traffic. For instance, the governor may send a notification to a telecommunications carrier identifying particular traffic to be blocked, resulting in the telecommunications carrier blocking the particular traffic.

In some cases, the predefined number of packets selected and sent by the network broker to the detection engine may be a predefined initial number of packets, and based on the inspection of the predefined initial number of packets, the network broker may, under instructions from the detection engine, select and send additional packets associated with one or more of the communication sessions to the detection engine to either collect more information/intel or to help support a decision to block or recommend blocking a particular communication. The network broker and the detection engine may be on the same device, such as a switch within the carrier infrastructure, or on different devices.

A dynamic optimizing component or a dynamic optimizer operating in the cloud-based system may monitor one or more factors (e.g., internal threat information, external threat information, asset characteristics, traffic protocol types, CPE load characteristics associated with the CPEs, etc.) and determine updated packet selection rules for the network broker based on the monitored factor(s). In this way, packet inspection is dynamically optimized enabling greater cyber security for the home network and/or the mobile network while allowing the CPE and the home network and/or the mobile communication devices and the mobile network to continue to operate effectively and efficiently.

The cloud-based implemented solution described above including the packet selection rules and/or the updated packet selection rules may be based on hundreds, thousands, or hundreds of thousands of CPEs or mobile communication devices. This lack of granularity into each particular CPE or mobile communication device may pose challenges. To combat this lack of granularity, the telecommunications carrier may provide context information such as dynamic host configuration protocol (DHCP) information, network address translation (NAT) information, and/or other information to the dynamic optimizer for use in monitoring the one or more factors and creating the packet selection rules and/or the updated packet selection rules. Additionally or alternatively, device fingerprinting may be used to provide further context information for use by the dynamic optimizer in monitoring the one or more factors and creating the packet selection rules and/or the updated packet selection rules. The device fingerprinting may be performed by one of the components in the cloud-based system such as the detection engine or the dynamic optimizer. Alternatively, the device fingerprinting may be performed by the CPE.

As mentioned above, the cloud-based system discussed above may be applied to a mobile environment. For example, traffic flowing through the network to and from mobile communication devices may be intercepted at one or more points in the network and the network broker may apply the packet selection rules. As with the fixed home network/CPE deployment, the packets provided by the network broker to the detection engine may be duplicate packets rather than the original packets. The network broker, detection engine, and dynamic optimizer may perform functionally as described above in the fixed home network/CPE deployment. In the mobile deployment, the network broker, dynamic optimizer, and/or detection engine may be distributed (e.g., co-located in a virtualized environment within the network) or centralized (i.e., executing from a computer system). In some embodiments, the fixed home network/CPE deployment and the mobile deployment may be integrated.

Turning to FIG. 1, a dynamic cloud-based threat detection system 100 is described. The dynamic cloud-based threat detection system 100 may comprise a customer premises equipment (CPE) 102, one or more electronic devices 104, a network broker 108, a computer system 110, a database 112, a telecommunications carrier server 114, and a network 116. The network 116 promotes communication between the components of the dynamic cloud-based threat detection system 100. The network 116 may be any communication network including a public data network (PDN), a public switched telephone network (PSTN), a private network, and/or a combination.

The CPE 102 is telecommunications and information technology equipment kept at a customer's physical location rather than on the telecommunications carrier's premises. The CPE 102 may comprise a router, a firewall, a home gateway, an access point, and/or another component. Communication traffic to and from the electronic devices 104 may flow through the CPE 102. In some embodiments, east/west communication traffic between internal endpoints within a home network 106 may also flow through the CPE 102. The electronic devices 104 may comprise one or more of a mobile phone, a smart phone, a wearable computer, a headset computer, a laptop computer, a notebook computer, a tablet computer, an Internet of Things (IoT) device, or another device.

In an embodiment, the CPE 102 and the electronic devices 104 are located within a home network 106. The home network 106 may be located in a residential environment, such as in a home. The home network 106 may interconnect the CPE 102 and the electronic devices 104 to the Internet such as via the network 116. As discussed above, home networks, such as the home network 106, are more prone to cyber-attack because of the growing amount of devices in home networks and the increased, differentiated use of home networks, as well as an increase in cyber security threats and a lack of basic cyber security measures in home networks.

As part of the dynamic cloud-based threat detection system 100, the computer system 110 may comprise a dynamic optimizing component or a dynamic optimizer 118, a detection engine 120, a governor 122, and load balancer(s) 124. These components may be stored in a non-transitory memory of the computer system 110 and executed by a processor of the computer system 110. Additional details regarding computer systems are discussed hereinafter with reference to FIG. 4. While illustrated separately in FIG. 1, in some embodiments, the network broker 108 and the detection engine 120 may be located on the same device within the carrier infrastructure, such as a switch.

The network broker 108 may be a stand-alone dedicated device. In some embodiments, the network broker 108 comprises an aggregator 126 and a packet selection component or a packet selector 128. The network broker 108 may collect, distribute, and filter data packets. The network broker 108 may comprise a switch, a router, a gateway (e.g., a Serving Gateway (SGW) or a Packet Data Network Gateway (PGW)), a User Plane Function (UPF) interface, or another device. The network broker 108 may be located in the network 116 between the source device and the destination device. For example, the network broker 108 may be located at the CPE 102, a switch, a router, a gateway (e.g., a Serving Gateway (SGW) or a Packet Data Network Gateway (PGW)), a User Plane Function (UPF) interface, a gNodeB, an eNodeB, or at some other location in the network 116. The network broker 108 may be in-line and receiving original data packets. Alternatively, the network broker 108 may be receiving duplicate packets.

In an embodiment, the cloud-based implemented solution does not interact directly with the CPE 102. In such an embodiment, the aggregator 126 receives a plurality of communication sessions associated with a plurality of CPE 102 (e.g., communication sessions sent from or to the plurality of CPE 102) from a telecommunications carrier such as via the telecommunications carrier server 114. The aggregator 126 may provide the plurality of communication sessions to the packet selector 128. While the aggregator 126 and the packet selector 128 are illustrated together within the network broker 108, in some embodiments the aggregator 126 and the packet selector 128 may be located in separate network devices.

The packet selector 128 may select a predefined number of packets from each communication session to initially send to the detection engine 120 based on the packet selection rules 130. In an embodiment, the packet selection rules 130 may be default packet selection rules. Based on the default set of rules, the packet selector 128 may select and send a default number such as 5 packets, 10 packets, 15 packets, or some other number of packets. The default number may depend on the type of communication protocol. In some cases, the default number may be the first 5 packets in a communication session, the first 10 packets in a communication session, the first 15 packets in a communication session, or some other number of packets potentially located in a place other than the beginning of a communication session.

In some embodiments, the packet selector 128 sends all of the packets from one or more communication sessions to the detection engine 120. In such embodiments, in some cases, the packet selector 128 may shift to sending a predefined number of packets less than the total number of packets based on one or more factor(s) monitored by the dynamic optimizer 118. The predefined number of packets selected and sent by the packet selector 128 to the detection engine 120 may be based on the packet selection rules 130 stored at the network broker 108. The packet selector 128 may apply different rules specifying different predefined numbers of packets depending on various characteristics of a given communication session. The packet selection rules 130 may be dynamically updated based on one or more factor(s) monitored by the dynamic optimizer 118.

The predefined number of packets initially selected and sent by the packet selector 128 to the detection engine 120 may vary depending on one or more characteristics of a particular communication session based on the packet selection rules 130. For instance, the predefined number of packets at least initially selected and sent by the packet selector 128 to the detection engine 120 may vary depending on the type of protocol used in the communication session (e.g., encrypted protocol type, an unencrypted protocol type, a stateful session protocol type, a stateless session protocol type, etc.). In one non-limiting example, if a particular communication session is encrypted, the packet selection rules 130 may indicate for the packet selector 128 to select the unencrypted packets at the beginning of the communication session. For a Transport Layer Security (TLS) handshake, the number of unencrypted packets at the beginning of an encrypted communication session may be 4. However, that number may be more or less depending on the protocol. For an encrypted communication session, selecting and sending any encrypted packets following the unencrypted packets to the detection engine 120 would be a waste of resources because of the encryption. In another non-limiting example, if a particular communication session uses a stateless session protocol type, the packet selection rules 130 may indicate that the packet selector 128 is to send all of the communication packets for the particular communication session. The stateless session protocol type may be User Datagram Protocol (UDP), which may include Domain Name System (DNS) queries, or other stateless communications.

Another factor that may affect the predefined number of packets at least initially selected and sent by the packet selector 128 to the detection engine 120 based on the packet selection rules 130 is asset characteristics. Asset characteristics consider asset value and asset risk for a given endpoint and may comprise one or more of an internal endpoint for a communication session, an operating system type of an internal endpoint, an external endpoint for a communication session, or another characteristic of the asset. Thus, the number of packets at least initially selected and sent by the packet selector 128 to the detection engine 120 may vary depending on an internal endpoint for a communication session, an operating system type of an internal endpoint, and/or an external endpoint for a communication session. In one non-limiting example, the packet selection rules 130 may specify that more packets from a first type of internal endpoint or external endpoint are to be selected and sent to the detection engine 120 than from a second type of internal endpoint or external endpoint. For instance, the packet selection rules 130 may specify a greater number of predefined packets are to be selected and sent by the packet selector 128 to the detection engine 120 for communication sessions that have an internal endpoint that is a laptop, PC, phone, or another device that is used for email and may be more prone to phishing attacks than, for example, a communication session that has an internal endpoint not used for emails such as an IoT device.

In another non-limiting example, the packet selection rules 130 may specify that a lesser number of predefined packets are to be selected and sent by the packet selector 128 to the detection engine 120 for communication sessions that have an internal endpoint that is of lower risk in terms of processing power, what the internal endpoint is connected to, and/or what is stored on the internal endpoint. In contrast, the packet selection rules 130 may specify that a greater number of predefined packets are to be selected and sent by the packet selector 128 to the detection engine 120 for communication sessions that have an internal endpoint that is higher risk in terms of more processing power, being connected to other devices/appliances that may cause more harm, and/or having more important data (e.g., financial records, etc.) stored thereon. For example, the packet selection rules 130 may specify that a greater number of predefined packets are to be selected and sent by the packet selector 128 to the detection engine 120 for communication sessions with a family computer in the home network 106 as an internal endpoint since it likely has more processing power and confidential information stored thereon.

Endpoints may comprise servers, laptops, desktops, set top boxes, wireless access points, routers, handsets, appliances, other network systems, new/transient devices, or other devices. As discussed above, the predefined number of packets at least initially selected and sent by the packet selector 128 to the detection engine 120 may vary depending on an operating system type of an internal endpoint. In yet another non-limiting example, the packet selection rules 130 may indicate that a larger number of packets for communication sessions with an internal endpoint having a particular operating system (e.g., ANDROID, iOS, etc.) are to be selected and sent by the packet selector 128 to the detection engine 120. In one additional non-limiting example, the packet selection rules 130 may indicate that a greater number of packets for communication sessions with an internal endpoint of a new/transient device within the home network 106 are to be selected and sent by the packet selector 128 to the detection engine 120 than for communication sessions with internal endpoints of previously established devices within the home network 106.

Another factor that may affect the number of packets at least initially selected and sent by the packet selector 128 to the detection engine 120 based on the packet selection rules 130 is threat information. The threat information may comprise internal threat information or external threat information. Internal threats may involve odd and/or concerning activity occurring within the home network 106 while external threats may involve odd and/or concerning activity occurring outside the home network 106. External threats may be based on time of day, geographic location, or other factors. The internal and/or external threat information may be stored in database 112 and sent to the dynamic optimizer 118 for use when creating the packet selection rules 130.

The network broker 108 may sit in line and receive original packets. Alternatively, the network broker 108 may receive duplicate packets. In order to avoid disruption of the traffic, the packet selector 128 may send duplicate packets to the detection engine 120.

In an embodiment, the packet selector 128 compares each communication session to an allow list. In an embodiment, the allow list is a whitelist. If the communication is a known, safe communication (i.e., found on the allow list), the packet selector 128 may not send any of the packets of the corresponding communication session to the detection engine 120. However, if the communication is not on the allow list, the packet selector 128 may apply the packet selection rules 130 and select and send a predefined number of packets to the detection engine 120.

The detection engine 120 may receive and inspect the predefined numbers of packets from the network broker 108 based on detection rules 132. The load balancer(s) 124 within the computer system 110 may balance the load of the predefined number of packets to a plurality of virtual compute instances based on communication session for inspection by the detection engine 120.

In an embodiment, the detection engine 120 performs deep packet inspection on the received packets. In an embodiment, the detection engine 120 performs one or more of header inspection, DNS packet inspection, TLS handshake inspection, or deep packet inspection on the received packets based on the detection rules 132. As mentioned above, packet inspection requires extensive resources and impacts overall network performance. By having the packet inspection performed on a pre-defined number of packets on the computer system 110, the CPE 102 and the network 116 do not experience the typical extensive resource and performance issues caused by traditional packet inspection.

While only one of each of the components is represented in FIG. 1, there may be a plurality of one or more of the components without departing from spirit or scope of the present disclosure. For example, in the cloud-based implemented solution, there may be hundreds, thousands, or hundreds of thousands of CPEs. The packet selection rules 130 and/or the updated set of rules may be based on the hundreds, thousands, or hundreds of thousands of CPEs. This lack of granularity into each particular CPE may pose challenges. To combat this lack of granularity, context information may be provided to the dynamic optimizer 118 for use in monitoring the one or more factors and creating the packet selection rules 130 and/or the updated packet selection rules. Such context information may be received from the CPE 102, the telecommunications carrier, and/or from the data packet itself. The context information may include device fingerprints, dynamic host configuration protocol (DHCP) information, network address translation (NAT) information, and/or other context information. DHCP is a network management protocol used on Internet Protocol (IP) networks for automatically assigning IP addresses and other communication parameters to devices connected to the network using a client-server architecture. NAT is a process that enables one, unique IP address to represent an entire group of computers. The telecommunications carrier server 114 may provide context information such as the DHCP and/or the NAT to the dynamic optimizer 118. The telecommunications carrier server 114 may be a computer system discussed hereinafter with reference to FIG. 4. Device fingerprinting may be performed by one of the components in the cloud-based system such as the detection engine 120 or the dynamic optimizer 118. Alternatively, the device fingerprinting could be performed by the CPE.

In some embodiments, to provide more granularity or targeting to each individual CPE 102, the cloud-based implemented solution may communicate with the CPE 102. In one such embodiment, the network broker 108 may receive the plurality of communication sessions via a standard interface 134 of the CPE 102 using standard, open source protocols like OpenSync. The standard interface 134 of the CPE 102 may be an interface already present on the CPE 102. In such an embodiment, the telecommunications carrier may authorize the dynamic optimizer 118 to access and obtain context information (e.g., the DHCP information and/or the NAT information) via an application programming interface 136 of the CPE 102. The dynamic optimizer 118 may use the DHCP information and/or the NAT information to help with monitoring the one or more factors and creating the packet selection rules 130 and/or the updated packet selection rules.

In another embodiment, a context agent 138 may be installed on the CPE 102, and send context information to the dynamic optimizer 118 for use in monitoring the one or more factors and creating the packet selection rules 130 and/or the updated packet selection rules. Use of context information such as device fingerprints, DHCP information, and/or NAT information may enable the packet selection rules 130 and/or the updated packet selection rules to be more targeted to an individual CPE 102.

The dynamic optimizer 118 may monitor one or more factors including internal threat information, external threat information, asset characteristics, traffic protocol types, CPE load characteristics, or other factors. The CPE load characteristics may include processor load on a processor of the CPE 102, memory load on a memory of the CPE 102, load on bandwidth, and/or connections per second. The CPE load characteristics may indicate an overall health of the CPE 102, which may in turn indicate an issue with or a security vulnerability of the CPE 102. The other factors including internal threat information, external threat information, asset characteristics, and traffic protocol types have been discussed in more detail above. The packet selection rules 130 created by the dynamic optimizer 118 may be based on monitoring the one or more factors.

The dynamic optimizer 118 may continue to monitor the one or more factors, create updated packet selection rules, and send the updated packet selection rules to the packet selector 128. The updated packet selection rules may increase or decrease the number of packets from particular communication sessions selected and sent by the packet selector 128 to the detection engine 120.

Based on the outcome of the inspection performed by the detection engine 120, a number of actions may take place. For example, the governor 122 may notify a telecommunications carrier to block particular communication traffic. In response to receiving the notification, the telecommunications carrier may block the particular communication traffic. In some embodiments, rather than notify the telecommunications carrier or in addition to notifying the telecommunications carrier, the network broker 108 may block or quarantine the particular communication traffic itself. In some cases, after inspecting the predefined number of packets but before notifying the telecommunications carrier and/or initiating blocking the particular communication traffic, the detection engine 120 may receive and inspect additional packets pertaining to the communication session(s) from the packet selector 128. Based on the inspecting of the additional packets, the governor 122 may determine whether or not to notify the telecommunications carrier and/or initiate the blocking of certain communication traffic. In other cases, after inspecting the predefined number of packets, the detection engine 120 may receive and inspect additional packets pertaining to one or more of the communication sessions from the packet selector 128 after the governor 122 notifies the telecommunications carrier and/or initiates blocking the particular communication traffic in order to gather more information/intel.

In some embodiments, the dynamic cloud-based threat detection system 100 may be applied to a mobile environment. For example, the dynamic cloud-based threat detection system 100 may comprise one or more mobile communication devices 140 running over one or more cellular data networks as well as a cell site 142. The cell site 142 may provide the mobile communication device 140 a wireless communication link to the network 116 according to a 5G, a long term evolution (LTE), a code division multiple access (CDMA), or a global system for mobile communications (GSM) wireless telecommunication protocol. In this way, the mobile communication device 140 may be communicatively coupled to the network 116 via the cell site 142. In 5G technology, the cell site 142 may be referred to a gNodeB. In 4G technology (e.g., long term evolution (LTE) technology), the cell site 142 may be referred to as an evolved Node B (eNB). In 3G technology (e.g., code division multiple access (CDMA) and global system for mobile communication (GSM)), the cell site 142 may be referred to as a base transceiver station (BTS) combined with a base station controller (BSC). The wireless communication device 140 may be a cell phone, a mobile phone, a smart phone, a personal digital assistant (PDA), an Internet of things (IoT) device, a wearable computer, a headset computer, a laptop computer, a tablet computer, a notebook computer, or another device.

Traffic flowing through the network 116 to and from mobile communication devices 140 may be intercepted at one or more points in the network 116 and the packet selector 128 may apply the packet selection rules 130. For example, with 4G technology, the data traffic interception point may be a Serving Gateway (SGW) or a Packet Data Network Gateway (PGW) such as via a SGW SGi-LBO Interface or a PGW SGi Interface. In another example, with 5G technology, the data traffic interception point may be the User Plane Function (UPF) such as via a MEC I-UPF N6 Interface or a UPF N6 Interface. As with the fixed home network/CPE deployment, the packets provided by the packet selector 128 to the detection engine 120 may be duplicate packets rather than the original packets. The network broker 108, detection engine 120, and dynamic optimizer 118 may perform functionally as described above in the fixed home network/CPE deployment. In the mobile deployment, the network broker 108, the dynamic optimizer 118, and/or the detection engine 120 may be distributed (e.g., co-located in a virtualized environment within the network 116) or centralized (i.e., executing from the computer system 110).

In an embodiment, the fixed home network/CPE deployment and the mobile deployment discussed above may be integrated. For example, as part of 5G evolution, the Access Gateway Function (AGF) may provide the gateway functionality to integrate residential users with mobile users under a common 5G control plane. This would provide a common virtualized function to mirror both fixed and mobile user traffic. As mentioned above, the network broker 108, the dynamic optimizer 118, and/or the detection engine 120 could either be co-located in the virtualized environment (i.e., distributed) or run in a separate cloud/date center (e.g., on the computer system 110) as a centralized function. The 5G Network Exposure Function may be used to communicate with the AGF to control the traffic mirroring by sending the packet selection rules 130/updated packet selection rules to the network broker 108 and control blocking of threats based on the detection rules 132 applied by the detection engine 120.

Figure 2:
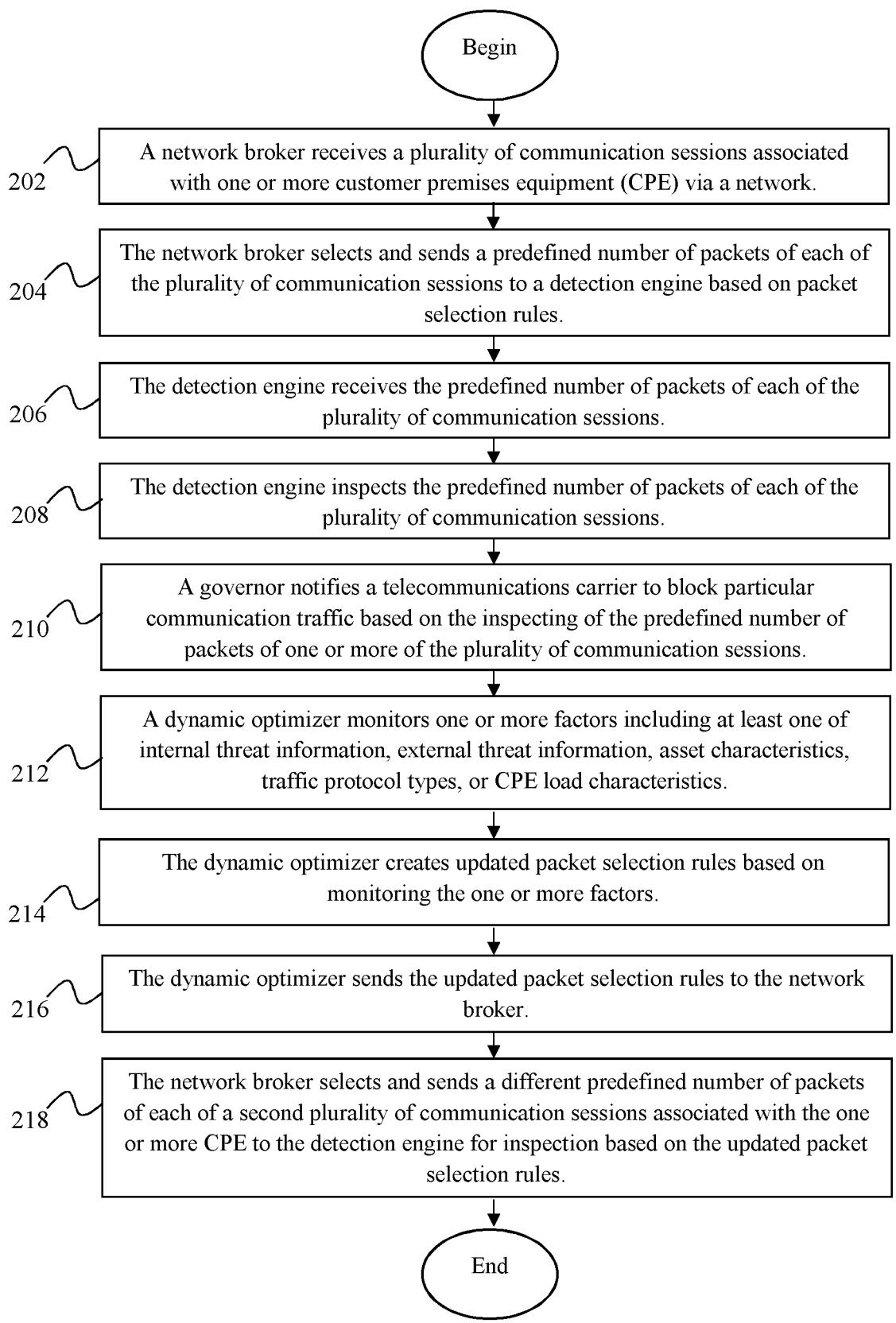
FIG. 2 is a flow chart of a dynamic cloud-based threat detection method according to an embodiment of the disclosure.

Turning now to FIG. 2, a method of dynamic cloud-based threat detection is described. At block 202, a network broker (e.g., network broker 108) receives a plurality of communication sessions associated with one or more customer premises equipment (CPE) (e.g., CPE 102). At block 204, the network broker selects and sends a predefined number of packets of each of the plurality of communication sessions to a detection engine (e.g., detection engine 120) based on packet selection rules (e.g., packet selection rules 130). At block 206, the detection engine receives the predefined number of packets of each of the plurality of communication sessions. At block 208, the detection engine inspects the predefined number of packets of each of the plurality of communication sessions. At block 210, a governor (e.g., governor 122) notifies a telecommunications carrier to block particular communication traffic based on the inspecting of the predefined number of packets of one or more of the plurality of communication sessions.

A block 212, a dynamic optimizer (e.g., dynamic optimizer 118) monitors one or more factors including at least one of the internal threat information, external threat information, asset characteristics, traffic protocol types, or CPE load characteristics. At block 214, the dynamic optimize creates updated packet selection rules based on monitoring the one or more factors. At block 216, the dynamic optimizer sends the updated packet selection rules to the network broker. At bock 218, the network broker selects and sends a different predefined number of packets of each of a second plurality of communication sessions associated with the one or more CPE to the detection engine for inspection based on the updated packet selection rules.

Figure 3:
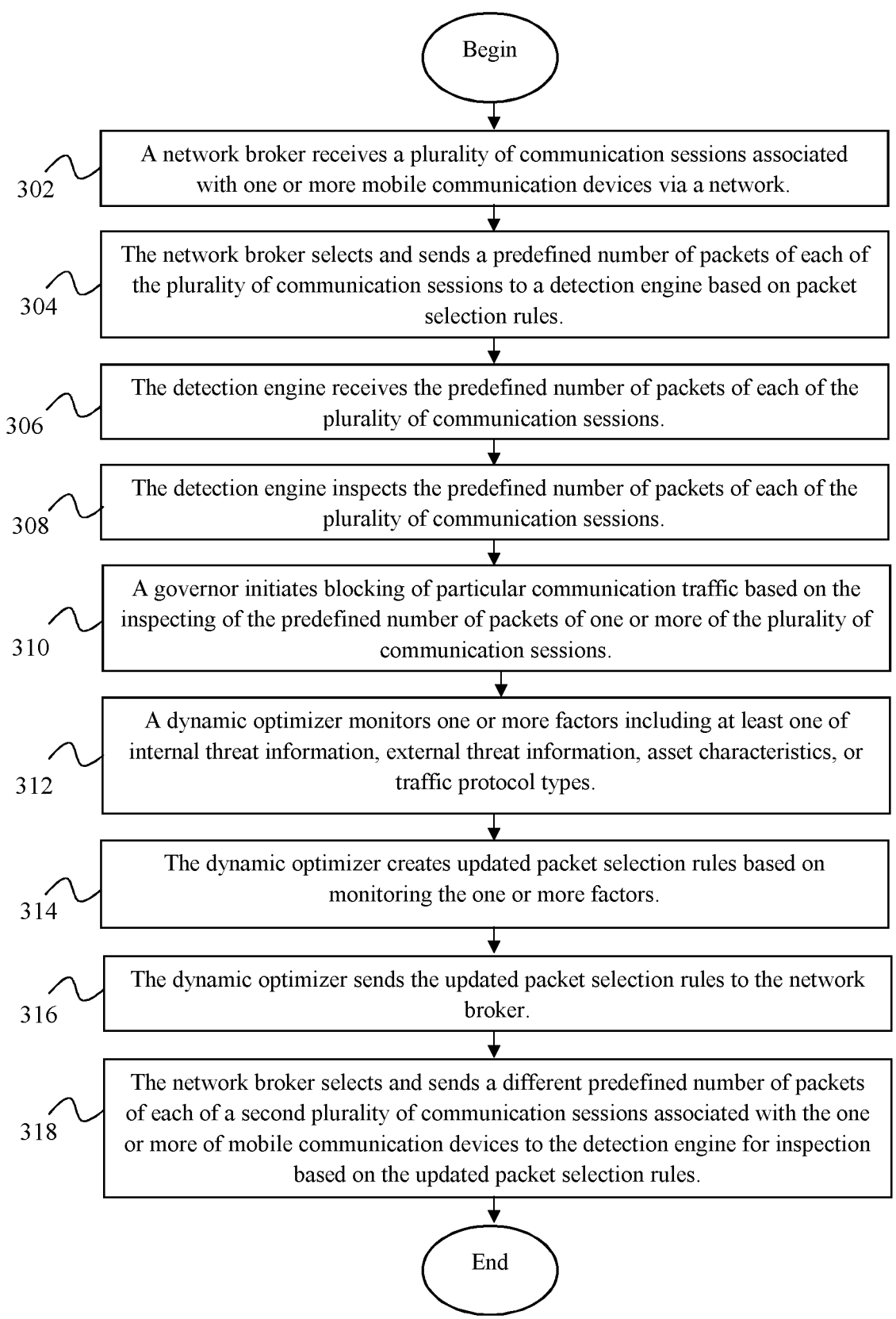
FIG. 3 is a flow chart of a dynamic cloud-based threat detection method according to an embodiment of the disclosure.

Turning now to FIG. 3, a method of dynamic cloud-based threat detection is described. At block 302, a network broker (e.g., network broker 108) receives a plurality of communication sessions associated with one or more mobile communication devices (e.g., mobile communication device 140). At block 304, the network broker selects and sends a predefined number of packets of each of the plurality of communication sessions to a detection engine (e.g., detection engine 120) based on packet selection rules (e.g., packet selection rules 130). At block 306, the detection engine receives the predefined number of packets of each of the plurality of communication sessions. At block 308, the detection engine inspects the predefined number of packets of each of the plurality of communication sessions. At block 310, a governor (e.g., governor 122) initiates blocking of particular communication traffic based on the inspecting of the predefined number of packets of one or more of the plurality of communication sessions.

A block 312, a dynamic optimizer (e.g., dynamic optimizer 118) monitors one or more factors including at least one of the internal threat information, external threat information, asset characteristics, or traffic protocol types. At block 314, the dynamic optimizer creates updated packet selection rules based on monitoring the one or more factors. At block 316, the dynamic optimizer sends the updated packet selection rules to the network broker. At block 318, the network broker selects and sends a different predefined number of packets of each of a second plurality of communication sessions associated with the one or more mobile communication devices to the detection engine for inspection based on the updated packet selection rules.

Figure 4:
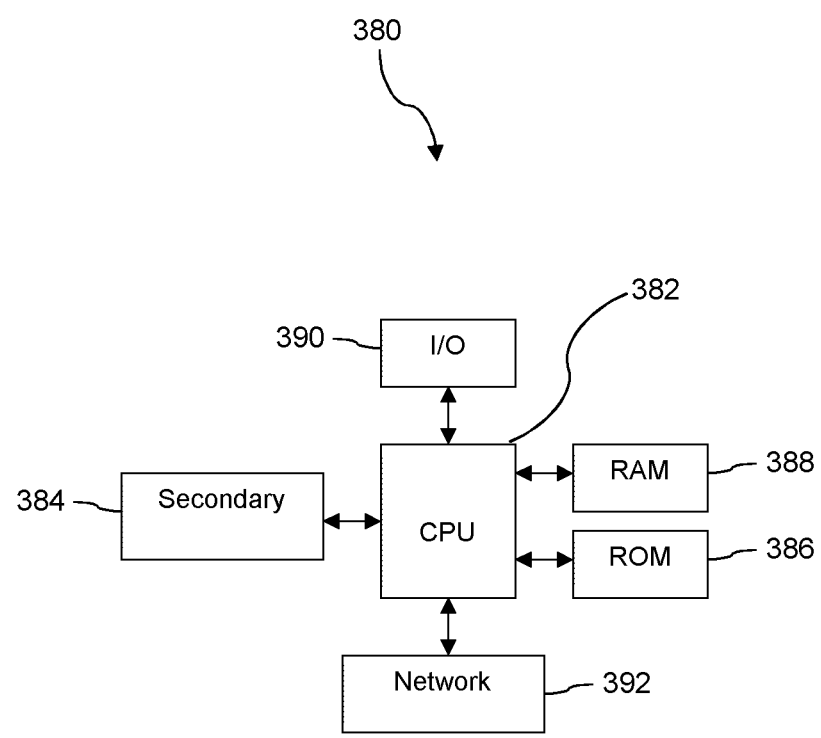
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the context of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of dynamic cloud-based threat detection, comprising:
 receiving, by a network broker via a network, a plurality of communication sessions associated with one or more customer premises equipment (CPE);
 selecting and sending, by the network broker, a predefined number of packets of each of the plurality of communication sessions to a detection engine based on packet selection rules;
 receiving, by the detection engine, the predefined number of packets of each of the plurality of communication sessions;
 inspecting, by the detection engine, the predefined number of packets of each of the plurality of communication sessions;
 notifying, by a governor, a telecommunications carrier to block particular communication traffic based on the inspection of the predefined numbers of packets of one or more of the plurality of communication sessions;
 monitoring, by a dynamic optimizer, one or more factors including at least one of internal threat information, external threat information, asset characteristics, traffic protocol types, or CPE load characteristics;
 creating, by the dynamic optimizer, updated packet selection rules based on monitoring the one or more factors, wherein the updated packet selection rules specify a greater predefined number of packets to be inspected when an endpoint of a given communication session possess first asset characteristics including one or more of a first operating system, being connected to a first endpoint, or storing a first type of data than when the endpoint of the given communication session possess second asset characteristics including one or more of a second, different operating system, being connected to a second, different endpoint, or storing a second, different type of data, and wherein the updated packet selection rules specify a greater predefined number of packets to be inspected when a first traffic protocol type is used in the given communication session than when a second, different traffic protocol type is used in the given communication session;
 sending, by the dynamic optimizer, the updated packet selection rules to the network broker; and
 selecting and sending, by the network broker, a different predefined number of packets of each of a second plurality of communication sessions associated with the one or more CPE to the detection engine for inspection based on the updated packet selection rules.

2. The method of claim 1, wherein inspecting the predefined number of packets of the plurality of communication sessions comprises performing one or more of header inspection, DNS packet inspection, TLS handshake inspection, or deep packet inspection on the predefined number of packets of the plurality of communication sessions.

3. The method of claim 1, wherein inspecting the predefined number of packets of the plurality of communication sessions comprises performing deep packet inspection on the predefined number of packets of the plurality of communication sessions.

4. The method of claim 1, wherein the detection engine and the dynamic optimizer are stored on and executable by a computer system.

5. The method of claim 1, wherein the network broker and the detection engine are located on the same device with infrastructure of the telecommunications carrier.

6. The method of claim 1, further comprising receiving, by the dynamic optimizer, context information for use in monitoring the one or more factors and creating the updated packet selection rules, wherein the context information comprises at least one of device fingerprints, dynamic host configuration protocol (DHCP) information, or network address translation (NAT) information.

7. The method of claim 1, wherein the predefined number of packets for a first communication session of the plurality of communication sessions is different than the predefined number of packets for a second communication session of the plurality of communication sessions, and wherein the first communication session and the second communication session comprise different protocols.

8. The method of claim 1, wherein the traffic protocol types comprise one or more of an encrypted protocol type, an unencrypted protocol type, a stateful session protocol type, or a stateless session protocol type.

9. A dynamic cloud-based threat detection system comprising:
 a network broker stored in a non-transitory memory, that when executed by a hardware processor:
  receives a plurality of communication sessions associated with one or more communication devices via a network, wherein the one or more communication devices comprise at least one of customer premises equipment (CPE) or a mobile communication device, and
  selects and sends a predefined number of packets of each of the plurality of communication sessions to a detection engine based on packet selection rules; and
 the detection engine stored in a non-transitory memory, that when executed by a hardware processor:
  receives the predefined number of packets of each of the plurality of communication sessions, and
  inspects the predefined number of packets of each of the plurality of communication sessions, wherein particular communication traffic is blocked based on inspection of the predefined numbers of packets of one or more of the plurality of communication sessions; and
 a dynamic optimizer stored in a non-transitory memory, that when executed by a hardware processor:
  monitors one or more factors including at least one of internal threat information, external threat information, asset characteristics, or traffic protocol types,
  creates updated packet selection rules based on monitoring the one or more factors, wherein the updated packet selection rules specify a greater predefined number of packets to be inspected when an endpoint of a given communication session possess first asset characteristics including one or more of a first operating system, being connected to a first endpoint, or storing a first type of data than when the endpoint of the given communication session possess second asset characteristics including one or more of a second, different operating system, being connected to a second, different endpoint, or storing a second, different type of data, and wherein the updated packet selection rules specify a greater predefined number of packets to be inspected when a first traffic protocol type is used in the given communication session than when a second, different traffic protocol type is used in the given communication session, and sends the updated packet selection rules to the network broker, wherein the network broker is further configured to select and send a different predefined number of packets of each of a second plurality of communication sessions associated with the one or more communication devices to the detection engine for inspection based on the updated packet selection rules.

10. The system of claim 9, wherein the dynamic optimizer monitors the one or more factors and creates the updated packet selection rules based on context information, and wherein the context information comprises at least one of device fingerprints, dynamic host configuration protocol (DHCP) information, or network address translation (NAT) information.

11. The system of claim 9, wherein the detection engine and the dynamic optimizer are stored and executed by a computer system.

12. The system of claim 9, wherein the network broker, the detection engine, and the dynamic optimizer are co-located.

13. The system of claim 9, wherein the inspection of the predefined number of packets of the plurality of communication sessions comprises performing deep packet inspection.

14. The system of claim 9, wherein the network broker is further configured to:
compare each communication session to an allow list, and
send the predefined number of packets for each communication session not on the allow list.

15. The system of claim 9, further comprising one or more load balancers configured to balance a load of the predefined number of packets of the plurality of communication sessions to a plurality of virtual compute instances based on communication session for inspection by the detection engine.

16. A method of dynamic cloud-based threat detection, comprising:
receiving, by a network broker via a network, a plurality of communication sessions associated with one or more mobile communication devices;
selecting and sending, by the network broker, a predefined number of packets of each of the plurality of communication sessions to a detection engine based on packet selection rules;
receiving, by the detection engine, the predefined number of packets of each of the plurality of communication sessions;

inspecting, by the detection engine, the predefined number of packets of each of the plurality of communication sessions;
initiating blocking, by a governor, of particular communication traffic based on the inspection of the predefined numbers of packets of one or more of the plurality of communication sessions;
monitoring, by a dynamic optimizer, one or more factors including at least one of internal threat information, external threat information, asset characteristics, of traffic protocol types;
creating, by the dynamic optimizer, updated packet selection rules based on monitoring the one or more factors, wherein the updated packet selection rules specify a greater predefined number of packets to be inspected when an endpoint of a given communication session possess first asset characteristics including one or more of a first operating system, being connected to a first endpoint, or storing a first type of data than when the endpoint of the given communication session possess second asset characteristics including one or more of a second, different operating system, being connected to a second, different endpoint, or storing a second, different type of data, and wherein the updated packet selection rules specify a greater predefined number of packets to be inspected when a first traffic protocol type is used in the given communication session than when a second, different traffic protocol type is used in the given communication session;
sending, by the dynamic optimizer, the updated packet selection rules to the network broker; and
selecting and sending, by the network broker, a different predefined number of packets of each of a second plurality of communication sessions associated with the one or more mobile communication devices to the detection engine for inspection based on the updated packet selection rules.

17. The method of claim 16, wherein inspecting the predefined number of packets of the plurality of communication sessions comprises performing deep packet inspection on the predefined number of packets of the plurality of communication sessions.

18. The method of claim 16, wherein the predefined number of packets for a first communication session of the plurality of communication sessions is different than the predefined number of packets for a second communication session of the plurality of communication sessions, and wherein the first communication session and the second communication session comprise different protocols.

19. The method of claim 16, wherein the packet selection rules comprise default packet selection rules, and wherein the predefined number of packets selected based on the default packet selection rules comprises a default dependent on a protocol type of communication session.

20. The method of claim 16, wherein the traffic protocol types comprise one or more of an encrypted protocol type, an unencrypted protocol type, a stateful session protocol type, or a stateless session protocol type.

* * * * *